United States Patent
Mulrane, Jr. et al.

(10) Patent No.: US 7,506,372 B2
(45) Date of Patent: Mar. 17, 2009

(54) METHOD AND APPARATUS FOR CONTROLLING CONNECTION RATE OF NETWORK HOSTS

(75) Inventors: Edward M. Mulrane, Jr., Lincoln, CA (US); Mauricio Sanchez, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 794 days.

(21) Appl. No.: 11/120,861

(22) Filed: May 3, 2005

(65) Prior Publication Data

US 2006/0250954 A1 Nov. 9, 2006

(51) Int. Cl.
*G06F 11/00* (2006.01)
*G06F 12/14* (2006.01)
*G06F 12/16* (2006.01)

(52) U.S. Cl. .................................................... 726/22
(58) Field of Classification Search .................. 726/22, 726/2; 370/229, 241
See application file for complete search history.

(56) References Cited

U.S. PATENT DOCUMENTS 6,988,279 B1 * 1/2006 Kanevsky ..................... 726/2

2004/0199793 A1 * 10/2004 Wilken et al. ............... 713/201
2006/0098579 A1 * 5/2006 Chang et al. ................ 370/242

OTHER PUBLICATIONS

Xuan Chen and John Heidemann. Detecting Early Worm Propagation through Packet Matching, Technical Report, ISI-TR-2004-585, USC/Information Sciences Institute, Feb. 2004.
D. Moore, C. Shannon, G. M. Voelker, S. Savage, Internet Quarantine: Requirements for Containing Self-Propagating Code, In *Proceedings of the IEEE Infocom*, pp. 1-10; San Francisco, CA, USA Mar. 2003, IEEE.
J. Twycross and M. M. Williamson. Implementing and testing virus throttle. In *Proceedings of the USENIX Security Symposium*, pp. 1-10, Washington, D.C., USA, Aug. 2003, USENIX.

* cited by examiner

*Primary Examiner*—Kambiz Zand
*Assistant Examiner*—Stephen Sanders

(57) ABSTRACT

A method for controlling data connections of host devices in a network includes creating a record of the number of attempted data connections from a host device through a connection device and the time of the most recent data connection attempt from the host device through the connection device. The difference between the current time that data from the host device is received by the connection device and the recorded time of the most recent data connection attempt by the host device is determined. Data is forwarded to its destination address if the difference between the current time and the recorded time is greater than a predetermined threshold time.

15 Claims, 3 Drawing Sheets

METHOD AND APPARATUS FOR CONTROLLING CONNECTION RATE OF NETWORK HOSTS

FIELD OF INVENTION

The present invention relates generally to computer network devices, and in particular, to a method and apparatus for monitoring outgoing connection attempts by a plurality of hosts in the network.

BACKGROUND OF THE INVENTION

The spread of viruses and worms has severe implications on the performance of virtually any network. Known methods for stopping the propagation of malicious code generally rely on anti-virus signature recognition to prevent hosts from being infected. Unfortunately, the latency between the introduction of a new virus into a network and the implementation/distribution of a patch can be significant. Within this period, a network can be crippled by the abnormally high rate of data traffic generated by infected hosts.

SUMMARY OF THE INVENTION

The present invention is directed to a method and apparatus for controlling outgoing data connections of host devices in a network having at least one connection device for enabling connections of the host devices to their destinations. The invention includes creating a record of the number of attempted data connections from a host device through the connection device and the time of the most recent data connection attempt from the host device. The difference between the current time that data from the host device is received by the connection device and the recorded time of the most recent data connection attempt by the host device is determined. Data is forwarded to its destination address if the difference between the current time and the recorded time is greater than a predetermined threshold time

DETAILED DESCRIPTION OF THE INVENTION

Broadly stated, the present invention is directed to a host-based connection rate filter for a network based on the concept of "virus throttling," which focuses on the network behavior of a virus or worm. The present invention prevents the attempted creation of a large number of outgoing connections in a set time period by a virus or worm, thereby "throttling," i.e., significantly slowing, or substantially blocking the spread of viruses or worms from any host attempting a network connection through the connection device of the present invention.

Figure 1:
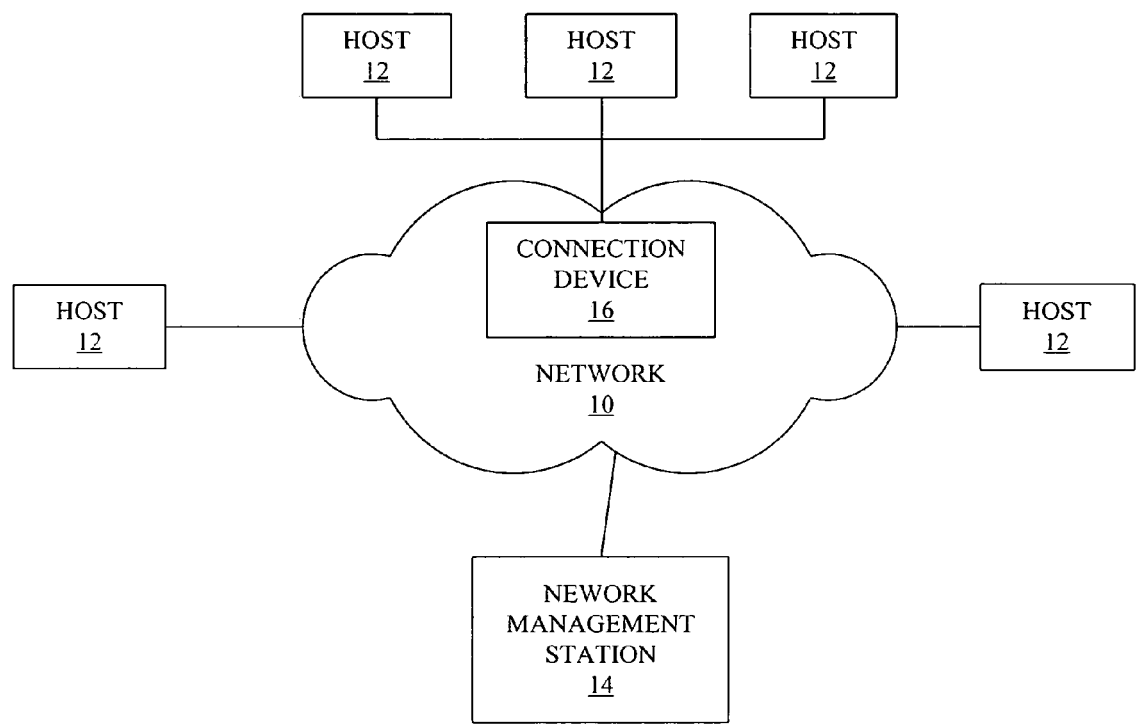
FIG. 1 is a diagram of a network environment in which the present invention is implemented.

Turning now to FIG. 1, the present invention is implemented in a network 10 such as a LAN, a WAN or the Internet, for example. The network 10 includes a plurality of hosts 12, a network management station 14 and a network connection device 16. The host 12 is a user device such as a PC or a workstation and the network management station 14 may be in the form of a server or a user device with applicable software for centrally controlling the devices in the network 10. The connection device 16 is a network device for controlling the connections of individual hosts 12 in the network that are configured to transmit data through the connection device. As used in this specification, a connection is defined as the initial data transmission between a unique pair of source/destination addresses. The network connection device 16 may be a router, a bridge (e.g., a wireless access point) or a switch, for example. The network 10 may also include various known network devices that are commonly associated with a computer network, but are not shown in the FIG. 1.

Figure 2:
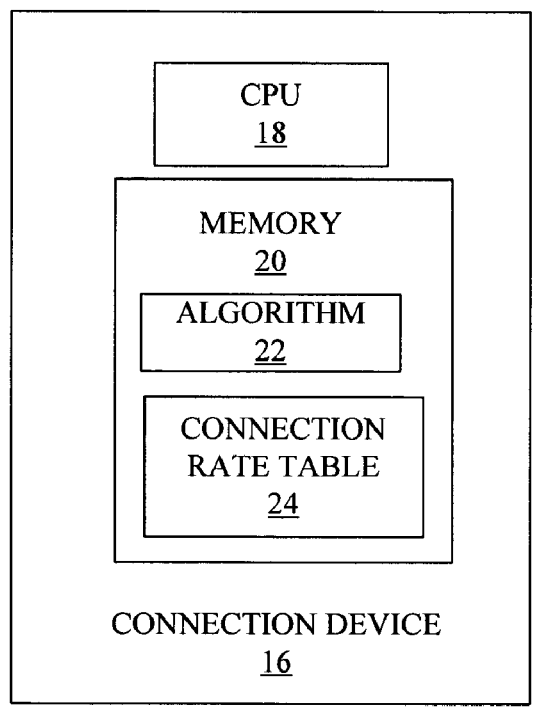
FIG. 2 is a block diagram of a network device in accordance with one embodiment of the present invention for monitoring outgoing connection attempts of a plurality of hosts in the network.

Turning now to FIG. 2, the connection device 16 in one embodiment includes a central processing unit (CPU) 18, and a memory 20 for providing data used by the CPU in performing its data connection functions. The memory 20 stores an algorithm 22 which enables the CPU 18 to monitor the rate of outgoing data connections attempted by the hosts 12, and determine whether to allow or prevent data connections to the intended destinations. The memory 20 also includes a connection rate table 24 used by the CPU 18 for keeping track of the number of outgoing connection attempts and the last time a connection attempt had been made by individual hosts 12. In one embodiment, the memory 20 is implemented using software which may be stored in a flash memory and loaded into a RAM.

Figure 3:
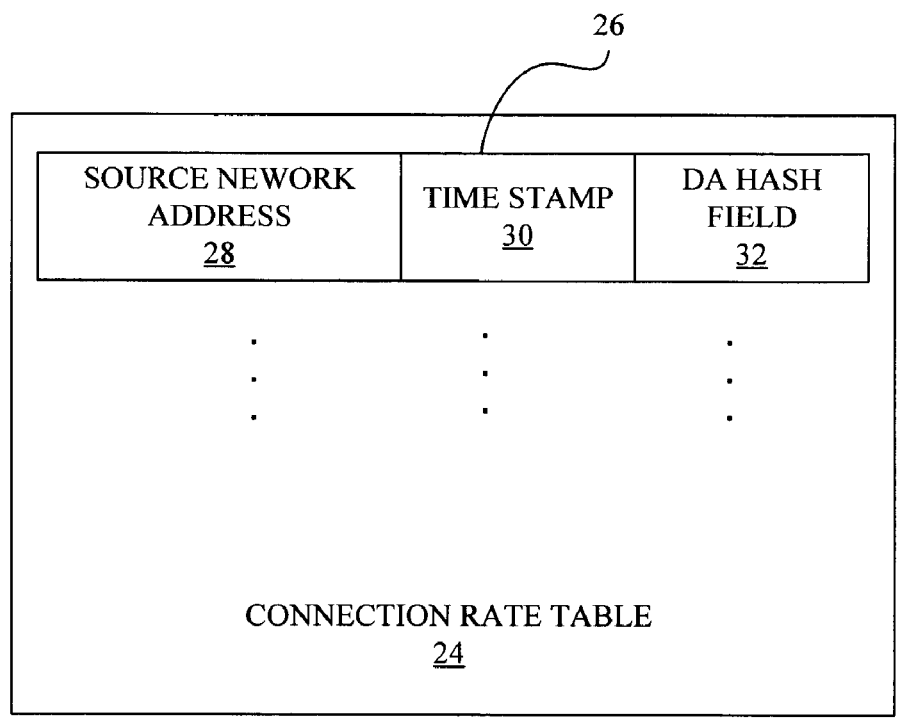
FIG. 3 is a diagram illustrating one embodiment of a table for tracking the outgoing connection rates of individual hosts in the network; and, FIG. 4 is a flowchart describing the process for determining whether a data packet from a host should be forwarded to its destination.

Referring to FIG. 3, the connection rate table 24 includes a plurality of entries 26 for data packets previously transmitted by the hosts 12 and received by the connection device 16. The entries 26 are indexed using the network address such as, for example, IP address, of the host 12 that has transmitted the data packet, so that receipt of all data packets from a single host are recorded to the same entry in the table 24. Each of the entries 26 includes a source network address field 28 for identifying the host 12 that transmitted the data packet, a timestamp field 30 for recording the timestamp indicating the time the last data packet had been received by the connection device 16 from the host, and a destination address (DA) hash field 32 for keeping track of the number of data packets received that establish new connections from the same host 12. The DA hash field 32 has a width of n bits, which is predefined based on the sensitivity of connection device 16 desired by the user. For example, the sensitivity of DA hash field 32 may be set such that the connection device 16 would detect a virus or worm when an average of 20 outgoing connection attempts are made within one second, or when an average of 50 outgoing connection attempts are made within one second. The former would be a more "sensitive" setting. Each time a data packet is transmitted by a host 12 through the connection device 16, a bit is set in the DA hash field 32 at the corresponding source network address, as described in more detail below.

Figure 4:
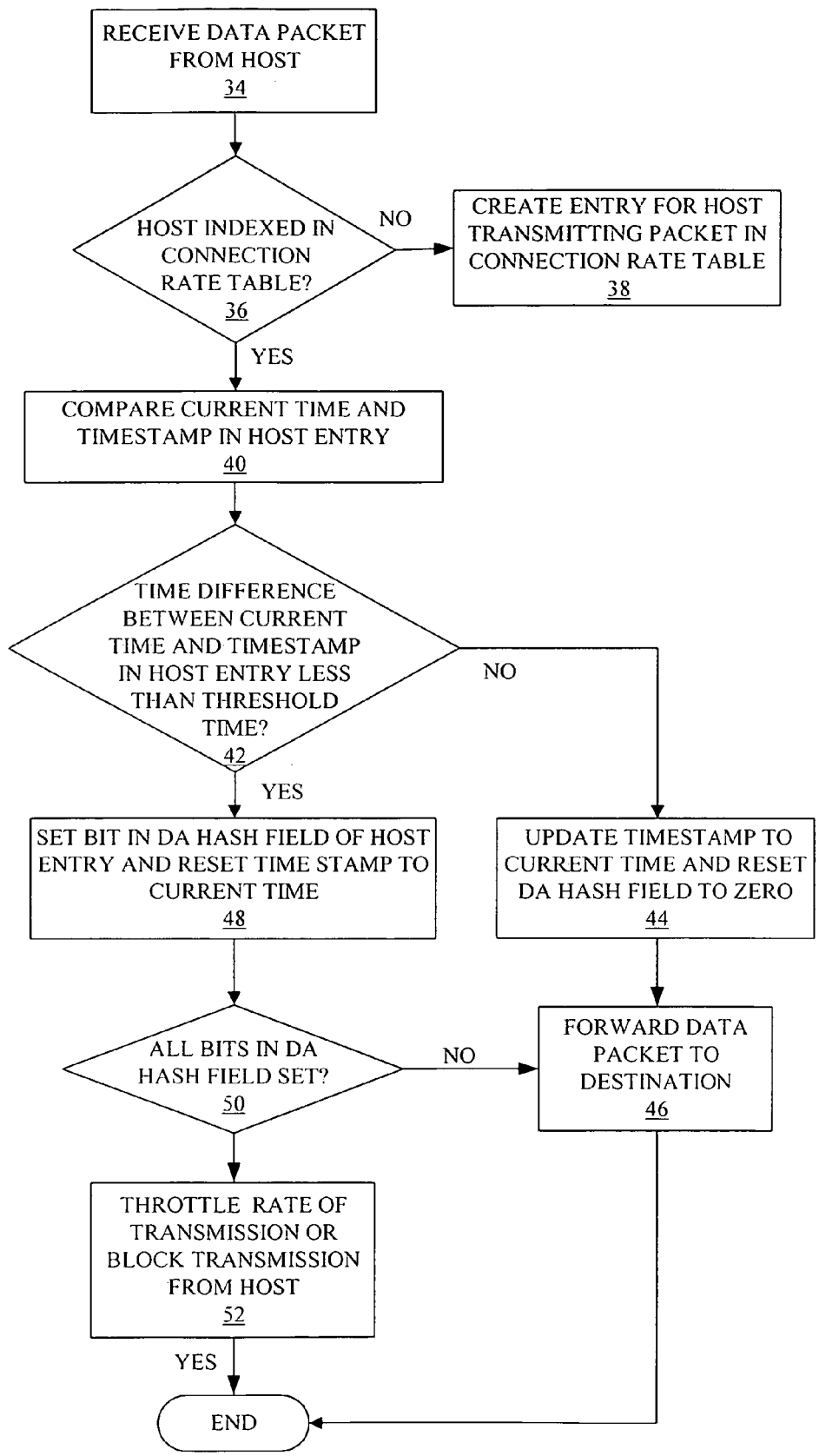

Turning now to FIG. 4 and in operation, the connection device 16 is configured to be in communication with the hosts 12 through the network 10. When any of the hosts 12 makes an outgoing connection attempt through the connection device 16, a data packet transmitted by the host is received by the connection device (block 34). The connection device 16 then determines whether an entry has been created in the connection rate table 24 for the host 12 transmitting the received data packet (block 36). If not, an entry 26 is created in the connection rate table 24 for the transmitting host 12, including entering a timestamp in the timestamp field 30 indicating the current time the data packet is received by the connection device 16, and setting a bit in the DA hash field 32 based on the destination address (block 38).

On the other hand, if an entry 26 does exist in the connection rate table 24 for the transmitting host 12 (block 36), the timestamp in the timestamp field 30 of the entry is compared with the current time (block 40). Then a determination is made as to whether the difference between the current time and the timestamp in the timestamp field 30 is less than a predetermined threshold time (block 42). If not, the DA hash field 32 is cleared, i.e., reset to zero, and the timestamp field 30 is updated to current time (block 44). The data packet is then forwarded to the destination indicated in the data packet (block 46). In other words, if the difference between the current time and the timestamp in the timestamp field 30 is greater than the predetermined threshold rate, then it is determined that the outgoing connection attempt is not made by a virus or worm. This is because one characteristic of a virus or worm is to attempt to make as many outgoing connection as possible within a very short amount of time, which characteristic is not displayed when the difference between the current time and the timestamp is greater than the predetermined threshold. Since the connection device 16 now knows that the connection attempt is not generated by a virus or worm, the data packet is forwarded by the connection device to the destination indicated in the data packet.

If, on the other hand, the difference between the current time and the time stamp is less than the rate threshold (block 42), a bit is set in the DA hash field 32 of the entry 26 for the host transmitting the data packet (block 48). A hash function that provides a uniform distribution for a set of network addresses is utilized to set a specific bit within the DA hash field 32. Also, the timestamp field 30 is reset to the current time (block 48). Then, the DA hash field 32 is examined to determine whether all n bits are set (block 50). If not, the data packet is forwarded to the intended destination (block 46). If, however, all n bits are set, the data packet is throttled, i.e., held and transmitted at a substantially slower rate than the rate at which the data packet are being transmitted from the host, or blocked entirely and not sent to its destination at all, i.e. the data packet is discarded (block 52). Subsequent data packets from the same host 12 are likewise throttled or blocked until a predetermined time period has elapsed, the rate of traffic from the host has decreased, or the connection device 16 is directed to allow traffic from the host to be forwarded uninhibited.

In other words, when a data packet is received in less threshold time from the previous data packet from the same host 12, and this is repeated a predetermined number of times, it is an indication that the hosts sending these data packets may be infected with a virus or worm. The connection device 16 then may send a notification to the host sending the data packets that it has been infected, and either throttle the rate at which data packets from the host can be sent, or block all subsequent data packets from the hosts until the administrator 14 explicitly re-enables traffic flow from that host.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for controlling outgoing data connections of at least one host device in a network having a plurality of host devices and at least one connection device for enabling connections of the plurality of host devices to a plurality of destinations, said method comprising:
    creating a record of a number of attempted data connections from a select host device through the connection device and a time of most recent data connection attempt from said select host device through the connection device;
    determining a time difference between a current time that current data from said select host device is received by the connection device and the recorded time of the most recent data connection attempt by said select host device;
    forwarding the current data to a destination address of the current data if said time difference between the current time and the recorded time is greater than a predetermined threshold time;
    determining whether said number of attempted data connections from said select host device through the connection device is greater than a predetermined threshold value if said time difference is equal to or less than said predetermined threshold time; and
    forwarding the current data to the destination address when said number of attempted data connections is less than said predetermined threshold value, and withholding the current data from the destination address when said number of attempted data connections is greater than or equal to said predetermined threshold value.

2. The method as defined in claim 1, wherein said record of a number of attempted data connections from said select host device is created in a table in the connection device.

3. The method as defined in claim 2, wherein said record includes a first field indicating a network address of said select host device, a second field for indicating said time of the most recent data connection attempt, and a third field for indicating said number of attempted data connections from said select host device.

4. The method as defined in claim 1, further comprising resetting said number of attempted data connections from said select host device through the connection device, if said time difference between the current time and the recorded time is greater than said predetermined threshold time.

5. An apparatus for controlling outgoing data connections of at least one host device in a network having a plurality of host devices, said apparatus comprising:
    a processor for enabling receipt of data packets transmitted from a select one of said plurality of the host devices;
    a memory for storing a record of a number of data packets received from said select host device and a time of the most recent data packet received from said select host device; and,
    a program for enabling said processor to determine a time difference between a current time that current data packet from said select host device is received and the recorded time of the most recent data packet received from said select host device;
    wherein said program further enables said processor to forward said current data packet to a destination address of the current data packet if said time difference between the current time and the recorded time is greater than a predetermined threshold time,
    wherein said program further enables said processor to determine whether said number of data packets received from said select host device is greater than or equal to a predetermined threshold value if said time difference is less than said predetermined threshold time, and forwards said current data packet to the destination address when said number of data packets received is less than said predetermined threshold value, and withhold said current data packet from the destination address when said number of data packets received is greater than or equal to said predetermined threshold value.

6. The apparatus as defined in claim 5, wherein said record is stored in a form of a table.

7. The apparatus as defined in claim 6, wherein each of said record includes a first field indicating a network address of said select host device, a second field for indicating said time the most recent data packet was received, and a third field for indicating said number of data packets received from said select host device.

8. The apparatus as defined in claim 5, wherein said program further enables said processor to reset said number of data packets received from said select host device if said time difference between the current time and the recorded time is greater than said predetermined threshold time.

9. A method for detecting computer viruses or worms in at least one host device in a network having a plurality of host devices and at least one connection device for enabling connections of the plurality of host devices to a plurality of destinations, said method comprising:
   creating a record of a number of attempted data connections from a select host device through the connection device, and a time of most recent data connection attempt from said select host device through the connection device;
   calculating a time difference between a current time that current data connection from said select host device is received by the connection device and the recorded time of the most recent data connection attempt by said select host device; and,
   determining whether said number of attempted data connections from said select host device through the connection device is greater than or equal to a predetermined threshold value if said time difference is less than said predetermined threshold time; and,
   determining that said select host device is infected with a virus or worm when said time difference between the current time and the recorded time is less than a predetermined threshold time, and said number of attempted data connections is greater than or equal to said predetermined threshold value.

10. A method for preventing spread of computer viruses or worms from at least one host device in a network having a plurality of host devices and at least one connection device for enabling connections of the plurality of host devices to a plurality of destinations, said method comprising:
   creating a record of a number of attempted data connections from a select host device through the connection device, and a time of most recent data connection attempt from said select host device through the connection device;
   calculating a time difference between a current time that current data connection from said select host device is received by the connection device and the recorded time of the most recent data connection attempt by said select host device;
   determining whether said number of attempted data connections from said select host device through the connection device is greater than or equal to a predetermined threshold value if said time difference is less than said predetermined threshold time;
   determining that said select host device is infected with a virus or worm when said time difference between the current time and the recorded time is less than a predetermined threshold time, and said number of attempted data connections is greater than or equal to said predetermined threshold value; and,
   withholding the current data from its destination.

11. The method as defined in claim 10 further comprising:
   determining that said select host device is not infected with a virus or worm when said time difference between the current time and the recorded time is greater than said predetermined threshold time, and forwarding the current data to its destination.

12. The method as defined in claim 10 further comprising determining that said select host device is not infected with a virus or worm when said number of attempted data connections is less than said predetermined threshold value; and forwarding the current data to its destination.

13. The method as defined in claim 10, wherein said record of said number of attempted data connections from said select host device is created in a table in the connection device.

14. The method as defined in claim 10, wherein said record includes a first field indicating a network address of said select host device, a second field for indicating said time of the most recent data connection attempt, and a third field for indicating said number of attempted data connections from said select host device.

15. The method as defined in claim 10, further comprising resetting said number of attempted data connections from said select host device through the connection device, when said time difference between the current time and the recorded time is greater than said predetermined threshold time.

* * * * *